United States Patent Office 2,842,959
Patented July 15, 1958

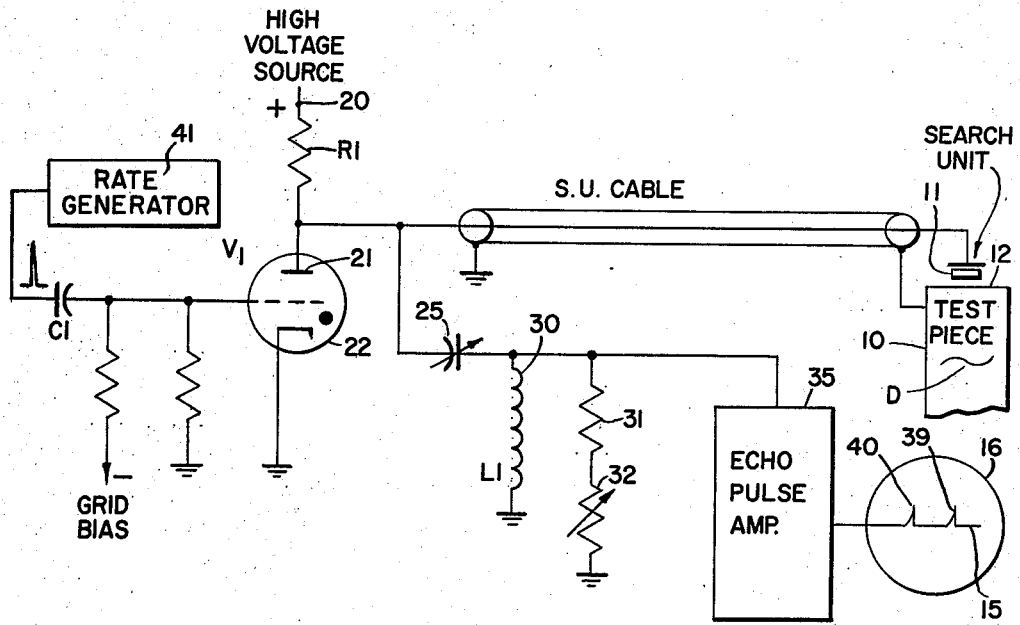

2,842,959

ULTRASONIC WAVE TRAIN GENERATOR

Elliott A. Henry, Newtown, Conn., assignor to Sperry Products, Inc., Danbury, Conn., a corporation of New York Application November 1, 1954, Serial No. 465,791

5 Claims. (Cl. 73—67.8)

This invention relates to the generation of ultrasonic wave trains which may be employed for the purpose of ultrasonic inspection of materials by measuring the time interval which elapses between the transmission of a pulse and the reception of the pulse reflection from a reflecting surface within the object to be inspected. In such devices it is highly desirable that a pulse of maximum efficiency be generated so that maximum power may be utilized relative to the energy expended in generating such pulse.

Ultrasonic wave trains have heretofore been generated mainly in the manner disclosed in the patent to Floyd A. Firestone, No. 2,398,701, granted April 16, 1946, in which a gaseous discharge tube periodically discharges to energize an oscillatory circuit. Limitations on pulses so generated are that the efficiency of such an ultrasonic wave train generator is low, and that the frequency of the first cycle of the pulse which contains the maximum energy is different from succeeding cycles. The reasons for these limitations are that the gaseous discharge tube is coupled to the tuning circuit by a charging capacitor which is used as a coupling capacitor, and when the tube becomes conductive this coupling capacitor together with the tube conducting impedance constitute a shunt reactance across the oscillatory circuit, thus decreasing its frequency to as much as one-half or one-third of the frequency of the tuned circuit alone. Thus the first cycle of the oscillatory circuit which impresses its voltage on the electro-acoustic transducer in engagement with the object, and which contains the most energy, is not at the desired frequency. This results in poor performance of the circuit for short pulses and a lowered efficiency. Furthermore, the pulse so generated, being of short duration, is applied to the transducer, which is in the form of a piezo-electric element, whose inertia prevents it from following the driving pulse, and therefore the deformation of the element and consequently the ultrasonic output is much less than it would be if the same peak voltage was applied at a slower rate.

This invention therefore has for its principal object to provide a wave train generator utilizing a piezo-electric element as the transducer which will be free of the above-mentioned limitations. It is one of the principal objects to provide a wave train generator in which the maximum amount of deformation of the piezo-electric element will be obtained with a given charging voltage.

It is a further object of the invention to provide a wave train generator in which the piezo-electric element will generate a wave train in which all of the cycles will be of the same frequency.

A further object is the provision of an efficient wave train generator suitable for driving piezo-electric elements of high dielectric constants and low impedances.

A further object is to provide in combination with a wave train generator an efficient receiving means for the returned echoes.

Further objects and advantages of this invention will become apparent in the following detailed description thereof.

The accompanying drawing is a wiring diagram of a circuit embodying the principles of this invention.

Referring to the drawing, the invention is shown as applied to the inspection of an object 10 by means of an ultrasonic transducer in the form of a piezo-electric element 11, preferably a barium titanate crystal, which is adapted to be energized electrically in order that the crystal may transmit mechanical pulses of limited duration into the test piece. The pulses will travel into the test piece through the entering surface 12 thereof and upon striking a reflecting surface such as, for example, a defect D within the object, will be reflected back to the crystal which will generate a voltage. The time interval between the transmission and the reception of the pulse reflection which may be indicated in any suitable manner as, for example, upon the sweep 15 of an oscilloscope 16, will give an indication of the location of the defect, the sweep circuit being synchronized with the generation of the pulse. The principle of such ultrasonic inspection is fully described in said Firestone Patent No. 2,398,701.

As stated in the introduction hereto, it is the object of this invention to provide a wave train generator which will be free of the objections heretofore present in such generators, as, for instance, the one shown in the said Firestone Patent 2,398,701, wherein the oscillatory circuit was connected to the gas discharge tube by means of a charging capacitor. In the present case the oscillations of the crystal 11 are obtained by charging said crystal from a source of D. C. voltage 20 through a load impedance R1, which voltage is applied to the plate 21 of a gas discharge tube 22. The voltage thus builds up slowly on crystal 11 during the quiescent period to the full extent of the voltage applied to plate 21, the charging rate being long with respect to the natural period of the crystal, so that when the tube 22 is triggered it becomes conductive and the energy stored in the transducer is discharged through the tube, the resistive impedance of the tube being low with respect to the direct current voltage source impedance which includes resistance R1. The crystal 11, which was deformed by the stress of the applied voltage to the maximum amount possible for the charging voltage, is now relieved of the stress and will tend to return to neutral or unstressed state. The inertia of the crystal will cause the crystal to overshoot or ring. Thus an ultrasonic wave train will be generated where the amplitude of the first cycle is the maximum possible amplitude for the given applied voltage, and furthermore the frequency of all cycles of the pulse are equal, said frequency being that of the transducer. The initial overshoot of the crystal generates a voltage of opposite polarity by reason of the piezo-electric effect, and as the algebraic sum of this generated voltage and the instantaneous plate voltage is negative with respect to the cathode of the thyratron 22, the latter is instantaneously deionized while the crystal continues to ring. The thyratron 22 is thus rendered conductive, forming a low impedance across the crystal 11, for only a short period that is less than one-half the natural period of the crystal. During the remainder of the action, with thyratron 22 deionized, the absence of this low shunting impedance provides greater amplitude of the effective echo signals available to the amplifier 35. As soon as the thyratron 22 is deionized, the charging process is started, but the charging rate is exponential and so slow that none of the charge component can be passed by capacitor 25.

The triggering of thyratron 22 is accomplished periodically by means of trigger pulses derived from the usual form of rate generator 41 whose output is coupled to the control electrode of the thyratron by means of the coupling capacitor C1.

When a reflection of the transmitted mechanical pulse is received from within the object 10, a voltage is generated and magnified by the network of passive elements comprising the electrostatic capacity of crystal 11, capacitor 25 and inductance 30. At this time, and in fact until the source 20 has been able, through impedance R1, to again build up a substantial D. C. charge on the transducer 11, the ringing transducer 11 and its effective internal capacitance will constitute the source for oscillations applied to a circuit comprising capacitor C2 in series with the inductance L1, the latter shunted by the resistances 31 and 32. As stated on page 50 of Terman's Radio Engineering," first edition, 1932, "In a series resonant circuit the voltages across the condenser and the inductance will both be very much greater than the applied voltage when the frequency is in the vicinity of resonance." The magnified voltage appearing across inductance 30 is, in the present case, made available for application to the cathode ray oscilloscope indicator. The degree of magnification is controlled by the combination of fixed and variable resistors 31, 32, which act as a shunt attenuator across the inductance 30. said amplified voltage may be further amplified by the thermionic amplifier 35 whose output is applied to the vertical plates of the oscilloscope 16 to yield a vertical deflection in the sweep as indicated at 39. The distance between the vertical deflection 40 in response to the transmitted pulse and the vertical deflection 39 in response to the received reflection is a measure of the time interval between sending and receiving the pulse, which in turn is a measure of the distance of the defect D beneath the entering surface of the object 10.

Having described my invention, what I claim and desire to secure by Letters Patent is:

1. An ultrasonic wave-train generating means comprising a piezo-electric element, a source of D. C. voltage connected to said element, and means for suddenly discharging said element comprising a gaseous discharge tube having an anode, grid and cathode; the anode being connected to said element and through a load impedance to said source of D. C. voltage.

2. Apparatus in accordance with claim 1, and a receiving circuit connected to the point of connection of said anode and said element.

3. Apparatus in accordance with claim 2, in which said receiving circuit includes a passive resonant circuit, and an output signal circuit connected across one component of said resonant circuit.

4. An ultrasonic wave-train generating means comprising a piezo-electric element, a charging circuit including a source of direct current voltage permanently connected to said element, a multi-electrode gaseous discharge device having its space path connected across said element, means normally biasing said device to discharge cut-off condition, and means for applying a momentary discharge-triggering potential opposing said biasing means to initiate conduction through said device, thereby to provide a discharge path for the energy stored in the capacitance of said element; the time constant of said charging circuit being such as to require a charging time which is long with respect to the natural period of said element, whereby the counter-voltage generated by said element immediately following conduction of said device substantially neutralizes the potential across its space path and restores the device to non-conducting condition.

5. An ultrasonic wave-train generating means in accordance with claim 4, and a receiving circuit connected to receive the generated output of said element.

References Cited in the file of this patent

UNITED STATES PATENTS

| | | |
|---|---|---|
| 1,817,030 | Eberhard | Aug. 4, 1931 |
| 2,398,701 | Firestone | Apr. 16, 1946 |

OTHER REFERENCES

Piezoelectricity, by Cady, pp. 546, 547, and 552, pub. by McGraw-Hill, 1946.